(12) United States Patent
Ohno et al.

(10) Patent No.: US 11,215,780 B2
(45) Date of Patent: Jan. 4, 2022

(54) OPTICAL FIBER CABLE

(71) Applicants: Fujikura Ltd., Tokyo (JP); NIPPON TELEGRAPH AND TELEPHONE CORPORATION, Tokyo (JP)

(72) Inventors: Masatoshi Ohno, Sakura (JP); Kouji Tomikawa, Sakura (JP); Ken Osato, Sakura (JP); Hiroaki Tanioka, Tsukuba (JP); Shigekatsu Tetsutani, Tsukuba (JP); Yohei Endo, Tsukuba (JP); Yuta Maruo, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/645,996

(22) PCT Filed: Dec. 11, 2018

(86) PCT No.: PCT/JP2018/045439
§ 371 (c)(1),
(2) Date: Mar. 10, 2020

(87) PCT Pub. No.: WO2019/124157
PCT Pub. Date: Jun. 27, 2019

(65) Prior Publication Data
US 2020/0209505 A1 Jul. 2, 2020

(30) Foreign Application Priority Data
Dec. 21, 2017 (JP) .............................. JP2017-245226

(51) Int. Cl.
*G02B 6/44* (2006.01)

(52) U.S. Cl.
CPC ................................. *G02B 6/4495* (2013.01)

(58) Field of Classification Search
CPC ........................... G02B 6/4495; G02B 6/4497
See application file for complete search history.

(56) References Cited

U.S. PATENT DOCUMENTS 5,642,452 A * 6/1997 Gravely ............... G02B 6/4433
385/103
7,197,215 B2 3/2007 Baird et al.
(Continued)

FOREIGN PATENT DOCUMENTS

| CN | 101706601 A | 5/2010 |
| CN | 202330805 U | 7/2012 |

(Continued)

OTHER PUBLICATIONS

International Search Report issued in International Application No. PCT/JP2018/045439, dated Feb. 12, 2019 (2 pages).
(Continued)

*Primary Examiner* — Eric Wong
(74) *Attorney, Agent, or Firm* — Osha Bergman Watanabe & Burton LLP

(57) ABSTRACT

An optical fiber cable includes: a cable body having a core and an inner sheath that accommodates the core; a reinforcing sheet that surrounds the cable body; an outer sheath that accommodates the cable body and the reinforcing sheet; and an outer ripcord that is embedded in the inner sheath. The inner sheath includes a projection that projects outwardly in a radial direction of the optical fiber cable. At least part of the outer ripcord is disposed inside the projection.

7 Claims, 10 Drawing Sheets

(56) References Cited

U.S. PATENT DOCUMENTS

| | | | | |
|---|---|---|---|---|
| 2001/0043781 A1* | 11/2001 | Yokokawa | ............ | G02B 6/4495 385/102 |
| 2002/0126970 A1* | 9/2002 | Anderson | ............ | G02B 6/4433 385/113 |
| 2006/0127016 A1* | 6/2006 | Baird | .................... | G02B 6/4433 385/113 |
| 2019/0131031 A1* | 5/2019 | Kobayashi | ............. | H01B 7/282 |
| 2021/0278616 A1* | 9/2021 | Ohno | ..................... | G02B 6/441 |

FOREIGN PATENT DOCUMENTS

| | | |
|---|---|---|
| CN | 102646483 A | 8/2012 |
| CN | 102681119 A | 9/2012 |
| EP | 2784788 A1 | 10/2014 |
| JP | S63259912 A | 10/1988 |
| JP | H10010384 A | 1/1998 |
| JP | H11095076 A | 4/1999 |
| JP | H11185534 A | 7/1999 |
| JP | 2001-264602 A | 9/2001 |
| JP | 2002-098870 A | 4/2002 |
| JP | 2005-148150 A | 6/2005 |
| JP | 2007-127887 A | 5/2007 |
| JP | 2008-076897 A | 4/2008 |
| JP | 2009-198701 A | 9/2009 |
| JP | 2009-258228 A | 11/2009 |
| JP | 2009-259478 A | 11/2009 |
| JP | 2010-526347 A | 7/2010 |
| JP | 2012-155229 A | 8/2012 |
| JP | 2013-045005 A | 3/2013 |
| JP | 2013-228567 A | 11/2013 |
| JP | 2014-095732 A | 5/2014 |
| JP | 2015-102707 A | 6/2015 |
| JP | 2015-215533 A | 12/2015 |
| JP | 2017-072801 A | 4/2017 |
| JP | 2017-097089 A | 6/2017 |
| JP | 2017204445 A | 11/2017 |
| WO | 2017/061196 A1 | 4/2017 |
| WO | 2017195640 A1 | 11/2017 |

OTHER PUBLICATIONS

Office Action issued in counterpart Korean Patent Application No. 10-2020-7008372 dated Oct. 7, 2021 (8 pages).

* cited by examiner

OPTICAL FIBER CABLE

TECHNICAL FIELD

The present invention relates to an optical fiber cable.

Priority is claimed on Japanese Patent Application No. 2017-245226, filed on Dec. 21, 2017, the content of which is incorporated herein by reference.

BACKGROUND

In the related art, an optical fiber cable as disclosed in PTL 1 has been known. The optical fiber cable includes a cable body having an optical fiber, a ripcord, a reinforcing sheet, and an outer sheath. The reinforcing sheet surrounds the cable body, and prevents the optical fiber from being damaged by the cable body being bitten by mice or squirrels. The ripcord is provided in a gap between the cable body and the reinforcing sheet and is used for ripping the reinforcing sheet and the outer sheath when the optical fiber cable is disassembled or when the mid-span branching work is performed.

Patent Literature

[PTL 1] Japanese Unexamined Patent Application, First Publication No. 2017-72801

In recent years, for example, a short optical fiber cable having a total length of about 1 meter has been used. When an optical fiber cable is short, even if the ripcord is used to rip the reinforcing sheet and the outer sheath, the ripcord may unexpectedly be pulled out from the inside of the optical fiber cable, and normal ripping work may not be performed. In particular, in the configuration of PTL 1, the ripcord is disposed in a gap between the cable body and the reinforcing sheet, and the ripcord may be easily pulled out during the ripping work.

In addition, when there is a portion where the reinforcing sheet is rounded and overlapped, if the ripcord is positioned inside the overlapping portion, the force required to rip the reinforcing sheet becomes extremely large. Therefore, placing the ripcord at a position that is not inside the overlapping portion of the reinforcing sheet when manufacturing the optical fiber cable is conceivable. However, in the configuration of the above-described PTL 1, the position of the ripcord is not stable, which causes a reduction in manufacturing efficiency.

SUMMARY

One or more embodiments of the present invention improve the ripping workability of the reinforcing sheet and the outer sheath and to improve the manufacturing efficiency of the optical fiber cable.

An optical fiber cable according to one or more embodiments of the present invention includes a cable body having a core and an inner sheath accommodating the core; a reinforcing sheet that surrounds the cable body; an outer sheath that accommodates the cable body and the reinforcing sheet; and an outer ripcord that is embedded in the inner sheath, wherein the inner sheath is provided with a projection which projects radially outward, and at least part of the outer ripcord is located inside the projection.

According to one or more embodiments of the present invention, it is possible to improve the ripping workability of the reinforcing sheet and the outer sheath and to improve the manufacturing efficiency of the optical fiber cable.

DETAILED DESCRIPTION

The configuration of an optical fiber cable according to one or more embodiments will be described below with reference to FIG. 1.

Figure 1:
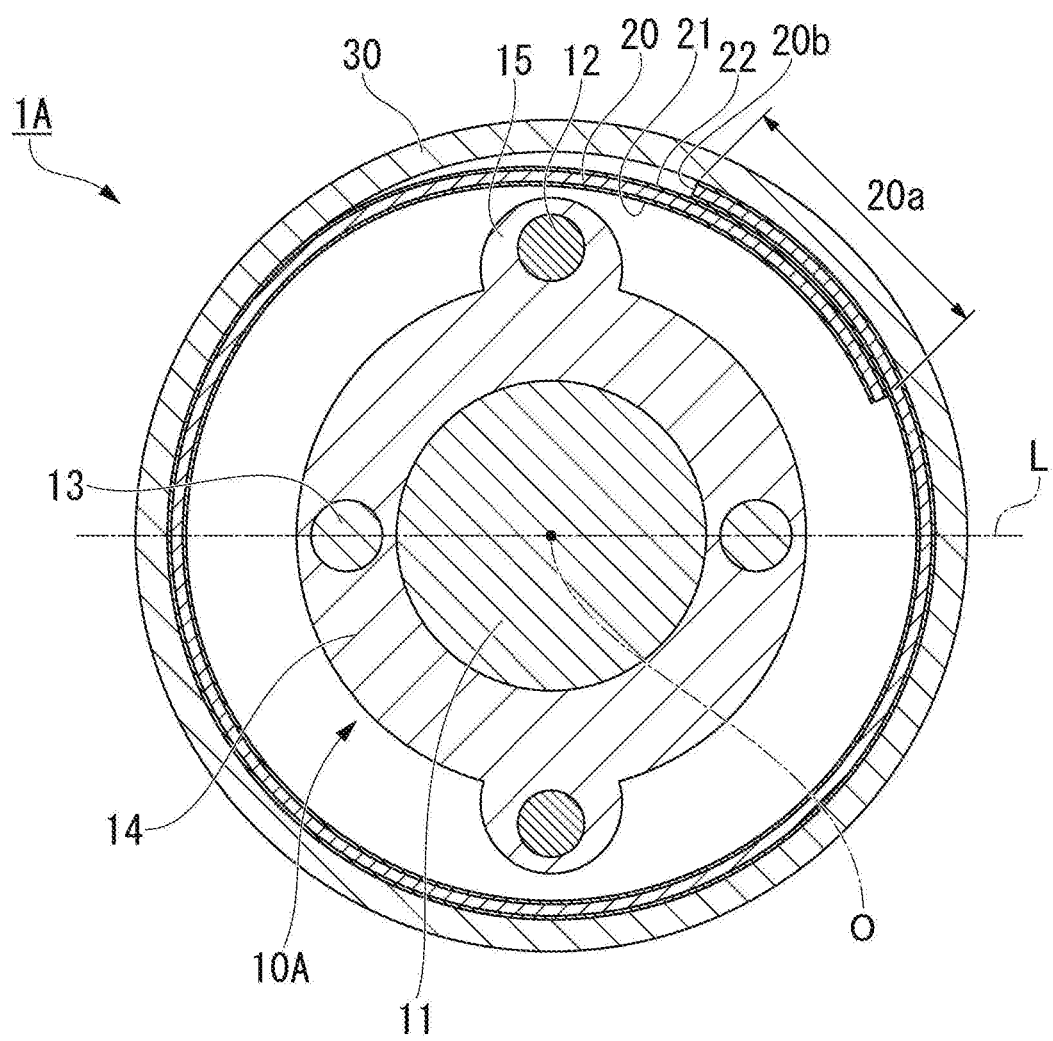
FIG. 1 is a cross-sectional view of an optical fiber cable according to one or more embodiments.

As shown in FIG. 1, an optical fiber cable 1A includes a cable body 10A having an optical fiber, a reinforcing sheet 20, and an outer sheath 30.

(Direction Definition)

In one or more embodiments, the longitudinal direction of the cable body 10A is simply referred to as the longitudinal direction, and the central axis of the cable body 10A is simply referred to as the central axis O. The cross-section perpendicular to the central axis O is also referred to as a transverse cross-section. In a cross-sectional view, a direction intersecting the central axis O is referred to as a radial direction, and a direction revolving around the central axis O is referred to as a circumferential direction.

The cable body 10A includes a core 11, a pair of outer ripcords 12, a pair of tension members 13, and an inner sheath 14.

The core 11 extends in the longitudinal direction. The core 11 is configured by gathering a plurality of optical fibers. An optical fiber strand, an optical fiber core, an optical fiber ribbon, or the like can be used as the optical fiber constituting the core 11. The plurality of optical fibers constituting the core 11 are bound by a binding material in a bundled state, for example. The plurality of optical fibers may be covered with a wrapping tube or a water absorbing tape (sheet). The cross-sectional shape of the core 11 is not particularly limited, and may be circular, elliptical, or rectangular.

The pair of tension members 13 are embedded in the inner sheath 14 so as to sandwich the core 11 in a cross-sectional view. Each of the tension members 13 extends in the longitudinal direction. Each tension member 13 may be disposed parallel to the core 11 in the longitudinal direction, or may be disposed in a spiral shape with the core 11 as the center.

The tension member 13 has a role of protecting the optical fiber of the core 11 from the tension acting on the optical fiber cable 1A. The material of the tension member 13 is, for example, a metal wire (such as a steel wire), a tensile fiber (such as an aramid fiber), or FRP. Each tension member 13 may be composed of a single linear member. Each tension member 13 may be configured by bundling or twisting a plurality of strands together.

A straight line connecting the centers of the pair of tension members 13 in the cross-sectional view is referred to as a neutral line L. When the optical fiber cable 1A is bent in a direction perpendicular to the neutral line L (vertical direction in FIG. 1), the expansion and contraction of the tension member 13 is smaller than when the optical fiber cable 1A is bent in the other direction. Therefore, it is relatively easy to bend the optical fiber cable 1A in a direction perpendicular to the neutral line L.

The cable body 10A may include three or more tension members 13. When three or more tension members 13 are arranged at equal intervals in the circumferential direction, the cable body 10A becomes to bend easily in any direction, and the optical fiber cable 1A can be more easily handled.

The core 11 and the pair of tension members 13 are collectively coated with the inner sheath 14. As a material for the inner sheath 14, a resin such as polyethylene (PE) or polyvinyl chloride (PVC) can be used.

The inner sheath 14 is formed in a substantially cylindrical shape. A pair of projections 15 projecting radially outward is formed on the outer peripheral surface of the inner sheath 14. The inner sheath 14 and the pair of projections 15 are integrally formed by extrusion molding or the like. The pair of projections 15 is disposed at equal intervals in the circumferential direction. In a cross-sectional view, the pair of projections 15 is located on a straight line that passes through the central axis O and is orthogonal to the neutral line L. Each projection 15 is formed in a substantially semicircular shape in a cross-sectional view.

The outer ripcord 12 is used in a work of ripping the reinforcing sheet 20 and the outer sheath 30 (hereinafter simply referred to as a ripping work). The outer ripcord 12 is required to have mechanical strength (for example, tensile strength) enough to cut the reinforcing sheet 20 and the outer sheath 30.

The pair of outer ripcords 12 is located on a straight line that passes through the central axis O and is orthogonal to the neutral line L in a cross-sectional view. Each outer ripcord 12 extends in the longitudinal direction. As the outer ripcord 12, a string formed by twisting synthetic fibers such as polyester and aramid can be used. The outer ripcords 12 are embedded in the projections 15 of the inner sheath 14 and are located inside the projections 15. In one or more embodiments, the outer ripcords 12 are not exposed to the outside of the projections 15 in a cross sectional view. Therefore, even if the inner sheath 14 and the projections 15 are extruded and then cooled in the water tank, it is possible to prevent moisture from penetrating into the outer ripcord 12.

The reinforcing sheet 20 extends in the longitudinal direction and is formed in a cylindrical shape surrounding the cable body 10A. As the material of the reinforcing sheet 20, metals such as stainless steel, copper, and copper alloys can be used. Further, a fiber sheet using glass fiber or aramid fiber, FRP, or the like may be used as the reinforcing sheet 20. In one or more embodiments, the reinforcing sheet 20 is formed in a tape shape, for example, and may be provided such that the length direction thereof matches the length direction of the cable body 10A. The thickness of the reinforcing sheet 20 is, for example, about 0.1 to 0.3 mm. By setting the thickness of the reinforcing sheet 20 in this range, the optical fiber of the core 11 can be prevented from being damaged by the eating damage of an animal and the operation of ripping the reinforcing sheet 20 by the outer ripcord 12 can be facilitated.

The reinforcing sheet 20 surrounds the cable body 10A over the entire circumference and is overlapped with a part in the circumferential direction. A portion where the reinforcing sheets 20 are overlapped is referred to as an overlapping portion 20a.

Here, the optical fiber cable 1A is bent easily in a direction perpendicular to the neutral line L as described above. Therefore, for example, when the overlapping portion 20a is positioned on the neutral line L, the overlapping portion 20a and the outer sheath 30 are relatively easily moved when the optical fiber cable 1A is handled. If the overlapping portion 20a and the outer sheath 30 move relatively, the side edge 20b of the reinforcing sheet 20 on the outer peripheral side in the overlapping portion 20a may damage the inner surface of the outer sheath 30. Therefore, in one or more embodiments, the side edge 20b and the tension member 13 are disposed at different positions in the circumferential direction in a cross-sectional view.

Further, in one or more embodiments, the entire overlapping portion 20a and the tension members 13 are disposed at different positions in the circumferential direction in a cross-sectional view. Thereby, the distance between the side edge 20b and the neutral line L increases, and it can suppress more reliably that the inner surface of the outer sheath 30 is damaged.

A first adhesive film 21 is attached to the surface of the reinforcing sheet 20 facing the cable body 10A. A second adhesive film 22 is attached to the surface of the reinforcing sheet 20 facing the outer sheath 30. As the adhesive used for the first adhesive film 21 and the second adhesive film 22, for example, a thermosetting adhesive can be used. In addition, the material of an adhesive may be changed as appropriate. The second adhesive film 22 has a role of fixing the outer sheath 30 to the reinforcing sheet 20. Further, a portion located between the reinforcing sheets 20 in the overlapping portion 20a among the first adhesive film 21 and the second adhesive film 22 serves to fix the reinforcing sheets 20 in the overlapping portion 20a.

The outer sheath 30 accommodates the cable body 10A and the reinforcing sheet 20. The outer sheath 30 is formed in a cylindrical shape extending in the longitudinal direction. As a material for the outer sheath 30, a resin such as polyethylene (PE) or polyvinyl chloride (PVC) can be used.

The outer sheath 30 may be provided with a mark indicating the position of the overlapping portion 20a of the reinforcing sheet 20. This mark may be a colored portion or a projection.

When taking out the core 11 from the optical fiber cable 1A, first, the outer sheath 30 and the reinforcing sheet 20 are partially cut by a tool such as a cutter. Next, a tool such as pliers is inserted from the cutting portion. By the tool, the outer ripcord 12 is held together with the projection 15 and is pulled out to the outside of the outer sheath 30. By this operation, the reinforcing sheet 20 and the outer sheath 30 are ripped by the outer ripcord 12 extending in the longitudinal direction, and the cable body 10A can be taken out. Then, the core 11 can be taken out by opening the cable body 10A.

According to the optical fiber cable 1A having the configuration described above, the outer ripcord 12 for ripping the reinforcing sheet 20 and the outer sheath 30 is embedded in the inner sheath 14. Therefore, the pulling force for pulling out the outer ripcord 12 from the optical fiber cable 1A is increased, and the outer ripcord 12 is prevented from being unexpectedly pulled out during the ripping work. Further, since at least part of the outer ripcord 12 is located inside the projection 15, the outer ripcord 12 is held together with the projection 15 using a tool or the like, and the outer ripcord 12 can be taken out to the outside of the outer sheath 30. Therefore, the ripping work using the outer ripcord 12 can be easily performed.

In addition, since the outer ripcord 12 is fixed in the projection 15, the position of the outer ripcord 12 is stabilized when the optical fiber cable 1A is manufactured. Thereby, it becomes easy to manufacture the optical fiber cable 1A such that the outer ripcord 12 is located in a region excluding the radially inner portion of the overlapping portion 20a of the reinforcing sheet 20, and the manufacturing efficiency can be improved.

Next, one or more other embodiments according to the present invention will be described, but the basic configuration is the same as that of the above-described embodiments. Therefore, the same reference numerals are given to similar configurations, the explanation thereof will be omitted, and only differences will be described.

The optical fiber cable 1B according to one or more embodiments is obtained by further improving the optical fiber cable 1A according to the above-described embodiments, and the operation of taking out the core 11 after ripping the reinforcing sheet 20 and the outer sheath 30 has become easier.

Figure 2:
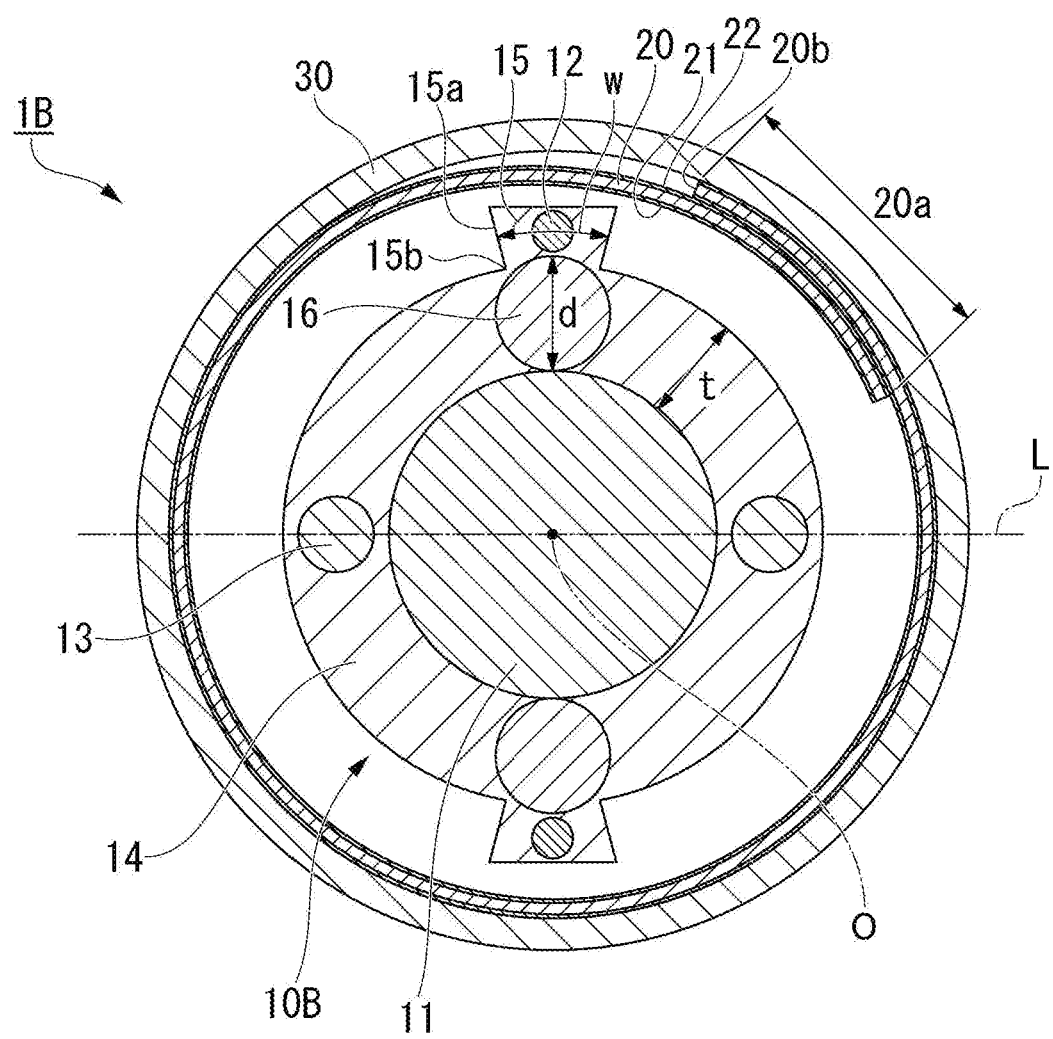
FIG. 2 is a cross-sectional view of an optical fiber cable according to one or more embodiments.

As shown in FIG. 2, the cable body 10B of one or more embodiments has a pair of inner ripcords 16 in addition to the pair of outer ripcords 12. The inner ripcord 16 is embedded in a radially inner portion of the inner sheath 14 than the projection 15 and the outer ripcord 12. Therefore, the thickness of the root portion 15b of the projection 15 is thin, and the projection 15 is broken starting from the root portion 15b and is easily separated from the inner sheath 14.

The inner ripcord 16 is in contact with the core 11. d≥t is satisfied, where d is an outer diameter of the inner ripcord 16 and t is a thickness of a portion of the inner sheath 14 where the projection 15 is not formed. The optical fiber cable 1B may not satisfy d≥t.

As a material of the inner ripcord 16, in addition to a string made of a synthetic fiber such as polyester or aramid, a cylindrical rod made of PP or nylon can be used.

The projection 15 of one or more embodiments is formed in a substantially rectangular shape in a cross sectional view. In the cross sectional view, the side surface 15a of the projection 15 is formed in a straight line. Further, the side surface 15a is inclined such that the width W of the projection 15 in the circumferential direction gradually increases toward the outer side in the radial direction. That is, the side surface 15a of the projection 15 is formed in a so-called reverse taper shape. Thereby, the pulling stress (tensile stress) is easily concentrated on the root portion 15b of the projection 15.

Next, a procedure for taking out the core 11 from the optical fiber cable 1B having the above configuration will be described.

Figure 3A:
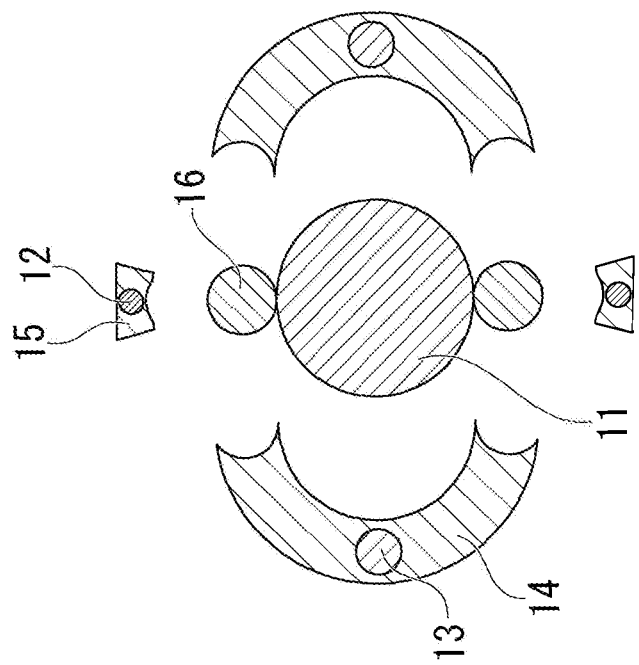
FIGS. 3A-3C are diagrams for explaining a work of taking out a core from the optical fiber cable of FIG. 2.

First, the outer sheath 30 and the reinforcing sheet 20 are partially cut using a tool such as a cutter. Next, an existing tool K such as pliers is caused to enter the reinforcing sheet 20, through the cutting portion, as shown in FIG. 3A. Then, the outer ripcord 12 is held together with the projection 15 with the tool K. At this time, since the width W of the projection 15 in the circumferential direction gradually increases toward the outer side in the radial direction, the tool K holding the projection 15 is unlikely to come off the projection 15.

Figure 3B:
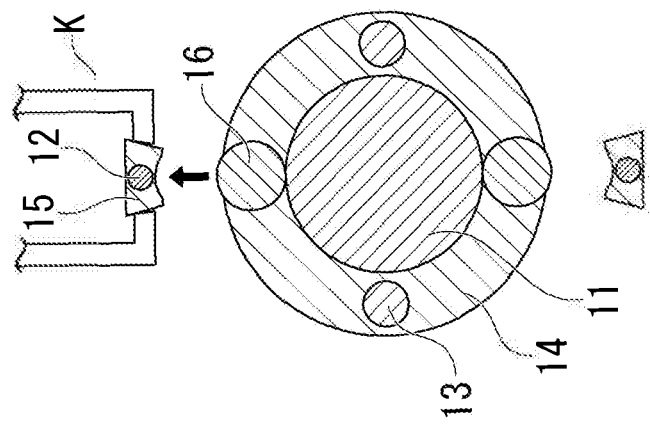

Next, as shown in FIG. 3B, the tool K is pulled up with the projections 15 being held. Thereby, the pulling stress concentrates on the root portion 15b of the projection 15, breakage occurs starting from the root portion 15b, and the projection 15 and the inner sheath 14 are separated. Thereby, the outer ripcord 12 together with the projection 15 can be pulled out of the outer sheath 30. Then, by continuously pulling up the outer ripcord 12, the reinforcing sheet 20 and the outer sheath 30 can be ripped by the outer ripcord 12.

When the outer ripcord 12 is used to rip the reinforcing sheet 20 and the outer sheath 30 along the longitudinal direction, the projection 15 and the outer ripcord 12 are separated from the inner sheath 14. Therefore, the projection 15 is also separated from the inner sheath 14 along the longitudinal direction.

Figure 3C:
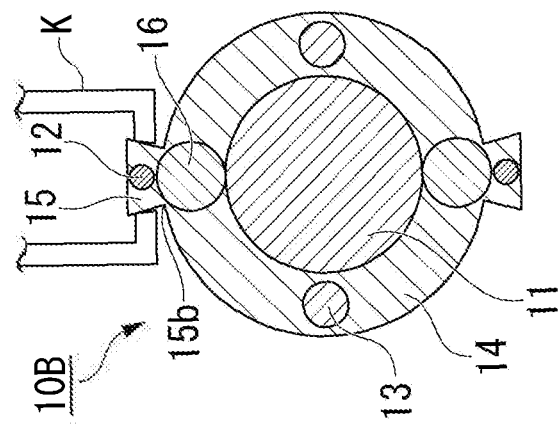

Here, the inner ripcord 16 is in contact with the core 11, and the outer diameter d of the inner ripcord 16 is equal to or greater than the thickness t of the inner sheath 14. Therefore, when the projections 15 and the inner sheath 14 are separated along the longitudinal direction, the inner sheath 14 is naturally divided into two pieces as shown in FIG. 3C. Thereby, the core 11 can be taken out easily.

As described above, according to the optical fiber cable 1B of one or more embodiments, the inner ripcord 16 is disposed in addition to the outer ripcord 12, and the reinforcing sheet 20 and the outer sheath 30 are ripped by using the outer ripcord 12, so the inner sheath 14 is naturally divided into two pieces. Therefore, the core 11 can be easily taken out during the disassembling operation of the optical fiber cable 1B, the mid-span branching work, or the like, and the working efficiency can be improved.

Further, the width W of the projection 15 in the circumferential direction increases toward the outer side in the radial direction. With this configuration, the projection 15 can be easily held by the tool K, and pulling stress is easily concentrated on the root portion 15b of the projection 15. Therefore, the work of pulling the outer ripcord 12 together with the projection 15 to the outside of the outer sheath 30 becomes easier.

Further, since the inner diameter d of the inner ripcord 16 and the thickness t of the inner sheath 14 satisfy d≥t, the inner sheath 14 is more reliably divided when the projection 15 and the inner sheath 14 are separated.

Figure 4:
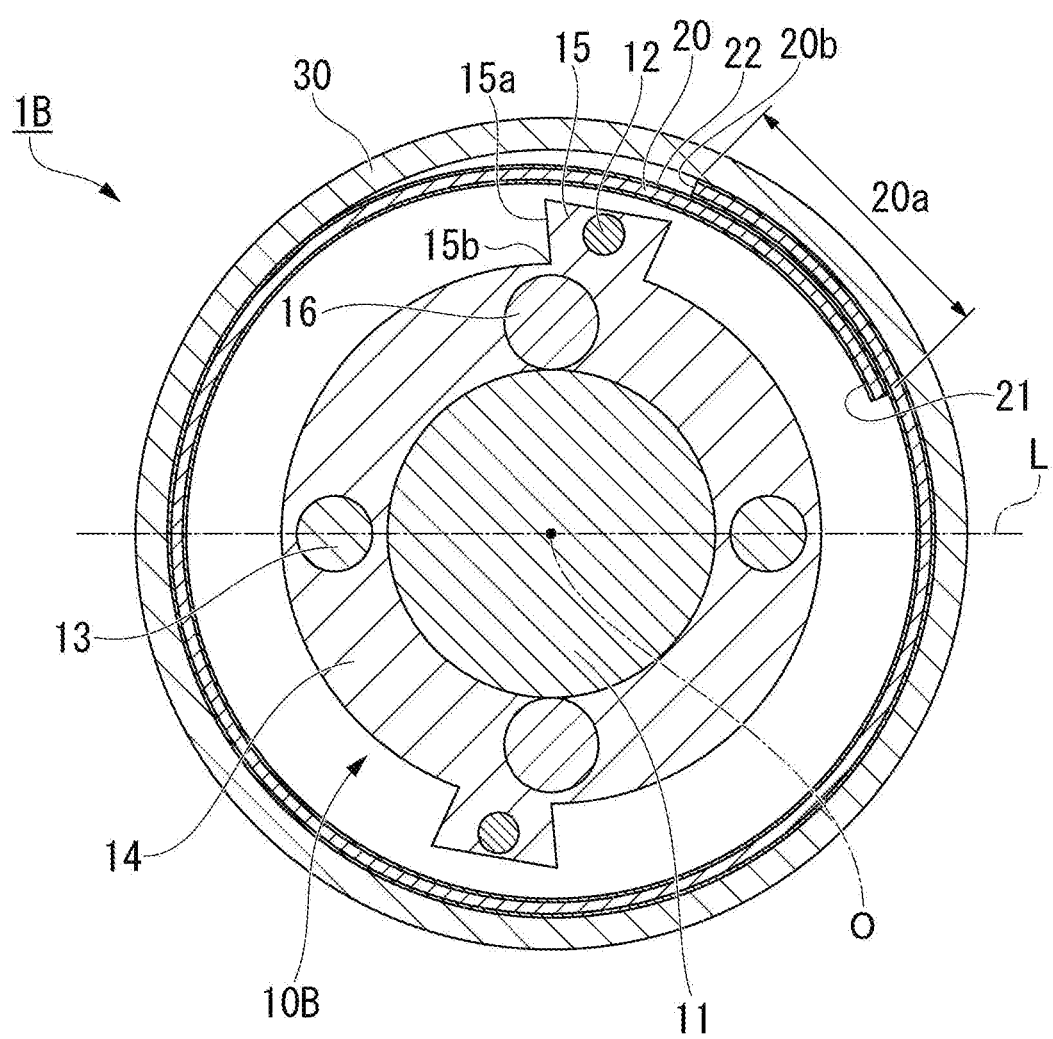
FIG. 4 is a cross-sectional view of an optical fiber cable according to a modification example of one or more embodiments.

In FIG. 2, the pair of inner ripcords 16 and the pair of outer ripcords 12 are disposed on a straight line in a cross-sectional view, but the present invention is not limited to this. For example, as shown in FIG. 4, the outer ripcord 12 may be disposed at a position shifted in the circumferential direction with respect to the inner ripcord 16. Even in this case, since the thickness of the root portion 15b of the projection portion 15 is reduced, breakage occurs starting from the root portion 15b, and the inner ripcord 16 can be easily exposed.

Next, one or more other embodiments according to the present invention will be described, but the basic configuration is the same as that of the above described embodiments. Therefore, the same reference numerals are given to similar configurations, the explanation thereof will be omitted, and only difference will be described.

In one or more embodiments, the waterproof performance is enhanced in consideration of the case where the optical fiber cable is installed outdoors or the case where the inner sheath 14 and the projection 15 are extruded and immersed in a water tank for cooling. In particular, when the outer ripcord 12 and the inner ripcord 16 are in the form of a string in which fibers are twisted together, moisture penetrates into the outer ripcord 12 and the inner ripcord 16, which may cause running water in the cable body.

Figure 5:
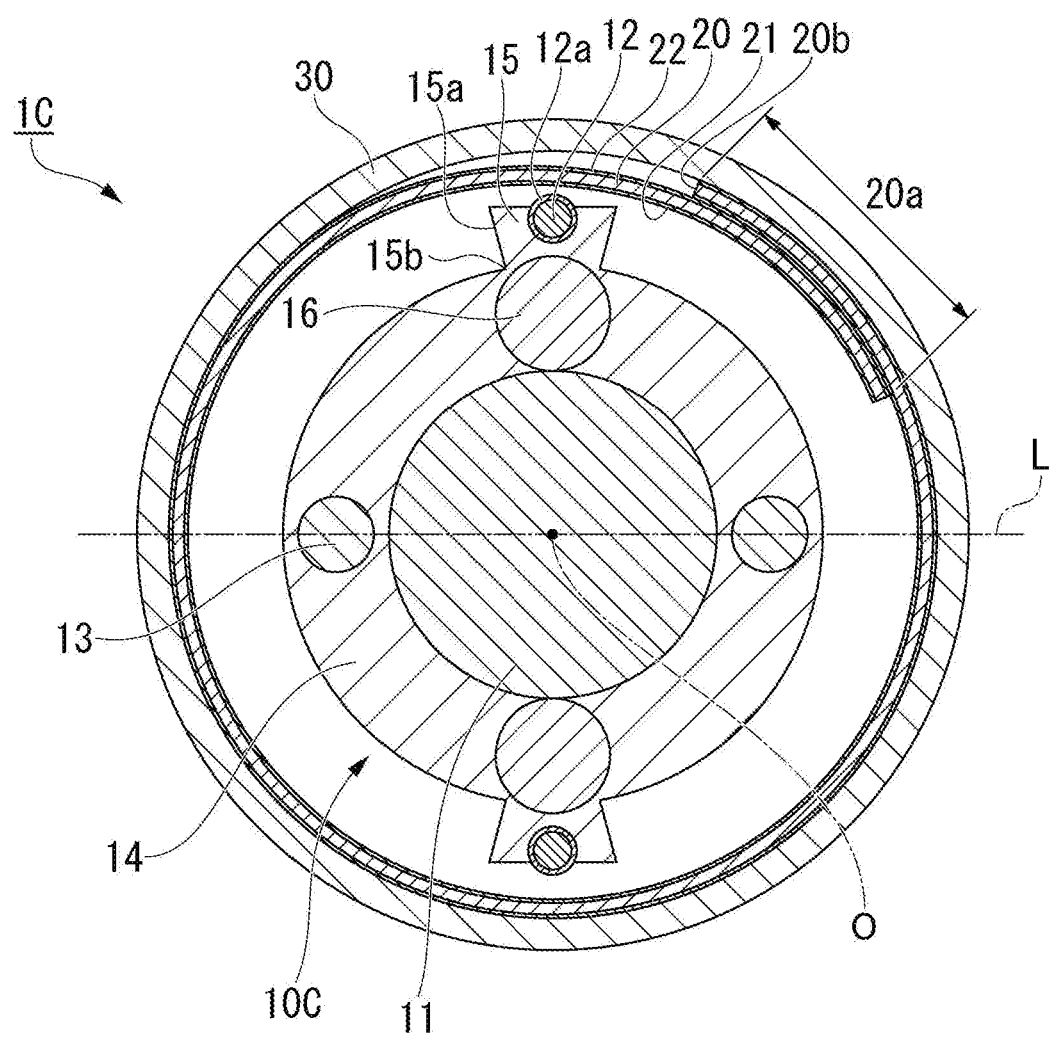
FIG. 5 is a cross-sectional view of an optical fiber cable according to on or more embodiments.

Therefore, in the optical fiber cable 1C of one or more embodiments, as shown in FIG. 5, the outer ripcord 12 is covered with a coating 12a. In one or more embodiments, the material of the coating 12a is a material that does not penetrate moisture. For example, the coating 12a may be formed by applying an adhesive resin to the outer periphery of the outer ripcord 12.

According to one or more embodiments, even when the outer ripcord 12 is partially exposed from the projection 15 as shown in FIG. 5, it is possible to prevent moisture from entering the projection 15 through the exposed portion. Therefore, running water in the cable body 10C can be prevented, and the waterproof performance can be enhanced.

Next, other embodiments according to the present invention will be described, but the basic configuration is the same as that of the above-described embodiments. Therefore, the same reference numerals are given to similar configurations, the explanation thereof will be omitted, and only differences will be described. In the above-described embodiments, the projection 15 projects radially outward from the outer peripheral surface of the columnar inner sheath 14. In one or more embodiments, the projection is formed by making the inner sheath 14 into a shape obtained by removing parts of the columnar shape.

Figure 6:
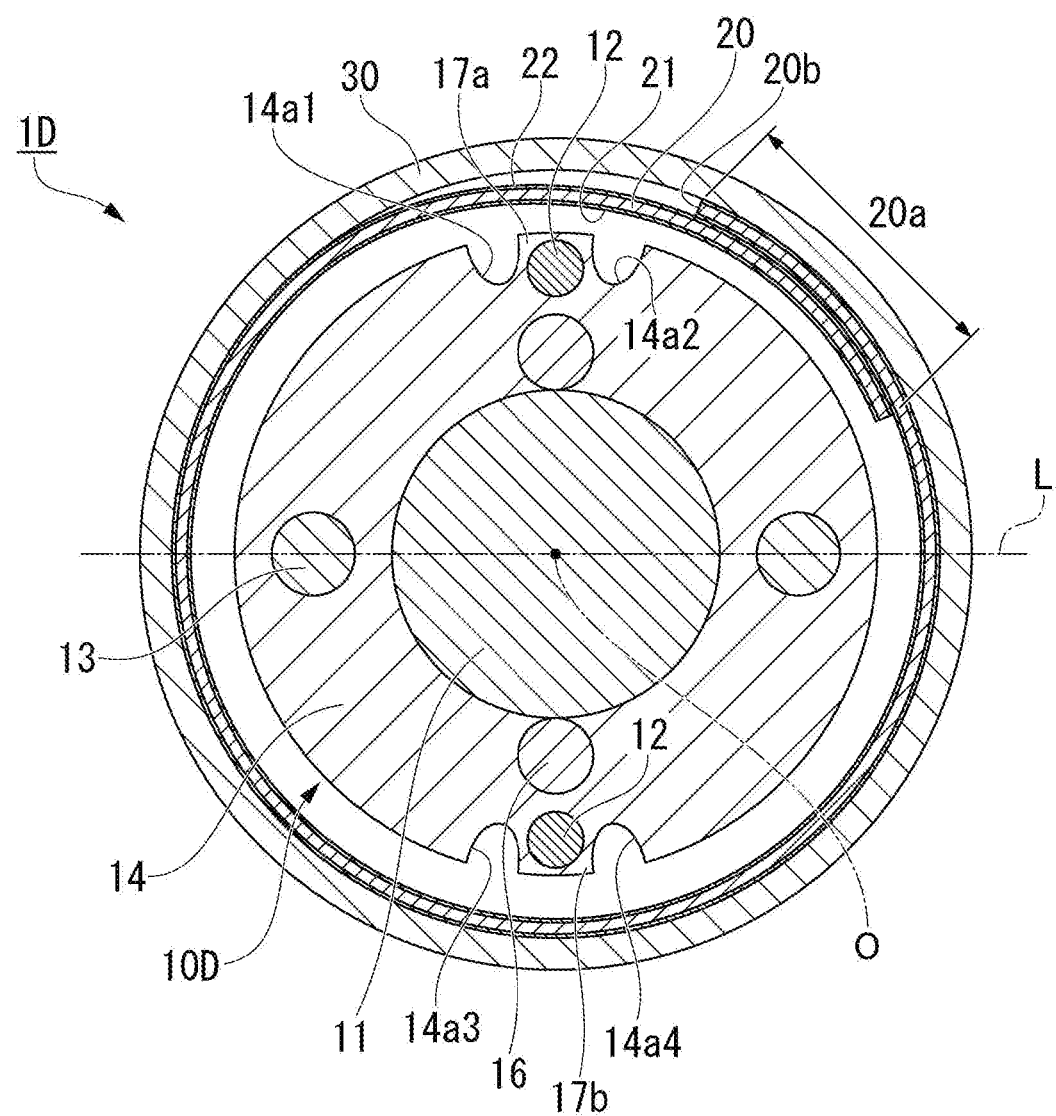
FIG. 6 is a cross-sectional view of an optical fiber cable according to one or more embodiments.

As shown in FIG. 6, in the optical fiber cable 1D (cable body 10D) of one or more embodiments, the first groove portion 14a1 and the second groove portion 14a2 that are recessed radially inward are formed on the outer peripheral surface of the cylindrical inner sheath 14. The first groove portion 14a1 and the second groove portion 14a2 are disposed at intervals in the circumferential direction. A portion of the inner sheath 14 between the first groove portion 14a1 and the second groove portion 14a2 has a shape projecting radially outward. That is, in one or more embodiments, the first projection 17a is formed by the pair of groove portions 14a1 and 14a2.

Further, a third groove portion 14a3 and a fourth groove portion 14a4 are formed on the opposite side in the radial direction of the groove portions 14a1 and 14a2, so as to sandwich the core 11. The third groove portion 14a3 and the fourth groove portion 14a4 are recessed radially inward from the outer peripheral surface of the inner sheath 14 and are disposed at intervals in the circumferential direction. A portion of the inner sheath 14 between the third groove portion 14a3 and the fourth groove portion 14a4 has a shape projecting radially outward. That is, the second projection 17b is formed by the pair of groove portions 14a3 and 14a4 disposed on the opposite side in the radial direction of the pair of groove portions 14a1 and 14a2.

The inner surfaces of the groove portions 14a1 to 14a4 are formed in a curved shape that projects radially inward. The shapes of the groove portions 14a1 to 14a4 may be changed as appropriate. For example, the groove portions 14a1 to 14a4 may have a triangular shape or a rectangular shape in a cross-sectional view. Further, the shapes of the groove portions 14a1 to 14a4 may be different from each other.

The pair of groove portions 14a1 and 14a2 forming the first projection 17a are disposed so as to sandwich the outer ripcord 12 in the circumferential direction. Similarly, the pair of groove portions 14a3 and 14a4 forming the second projection 17b are disposed so as to sandwich the outer ripcord 12 in the circumferential direction. Thereby, at least part of the outer ripcord 12 is located inside the first projection 17a or the second projection 17b.

The first projection 17a and the second projection 17b extend along the longitudinal direction. Even in one or more embodiments, the outer ripcord 12 can be pulled out of the outer sheath 30 by holding the first projection 17a or the second projection 17b with the tool K and pulling it up (see FIGS. 3A-3C).

Figure 7:
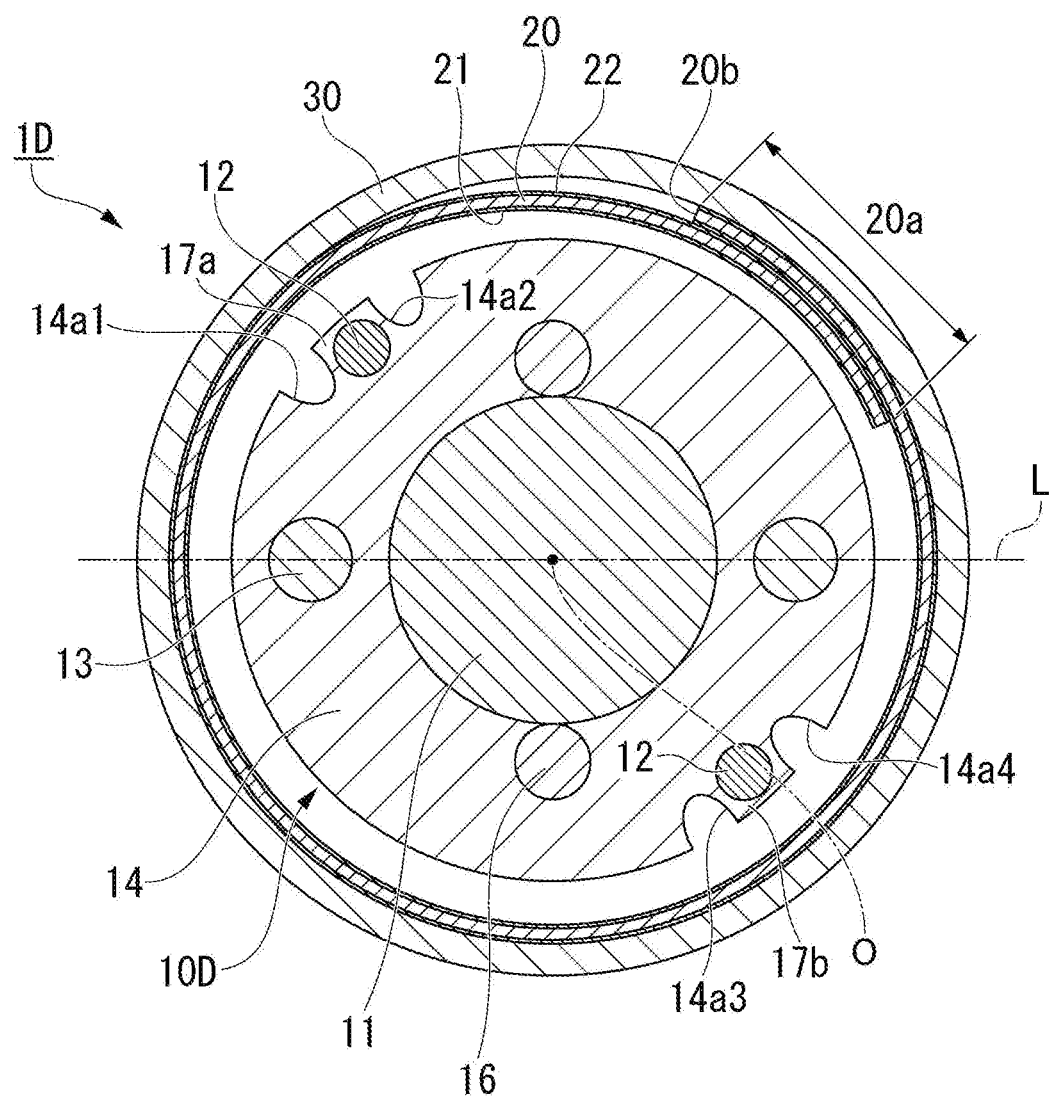
FIG. 7 is a cross-sectional view of an optical fiber cable according to a modification example of one or more embodiments.

In one or more embodiments, the pair of inner ripcords 16, the pair of outer ripcords 12, and the pair of projections 17a and 17b are disposed on a straight line in a cross sectional view. However, this arrangement may be changed as appropriate. For example, as shown in FIG. 7, the projections 17a and 17b (outer ripcords 12) may be disposed at positions different from the inner ripcords 16 in the circumferential direction.

Next, other embodiments according to the present invention will be described, but the basic configuration is the same as that of the above-described embodiments. Therefore, the same reference numerals are given to similar configurations, the explanation thereof will be omitted, and only differences will be described.

Figure 8:
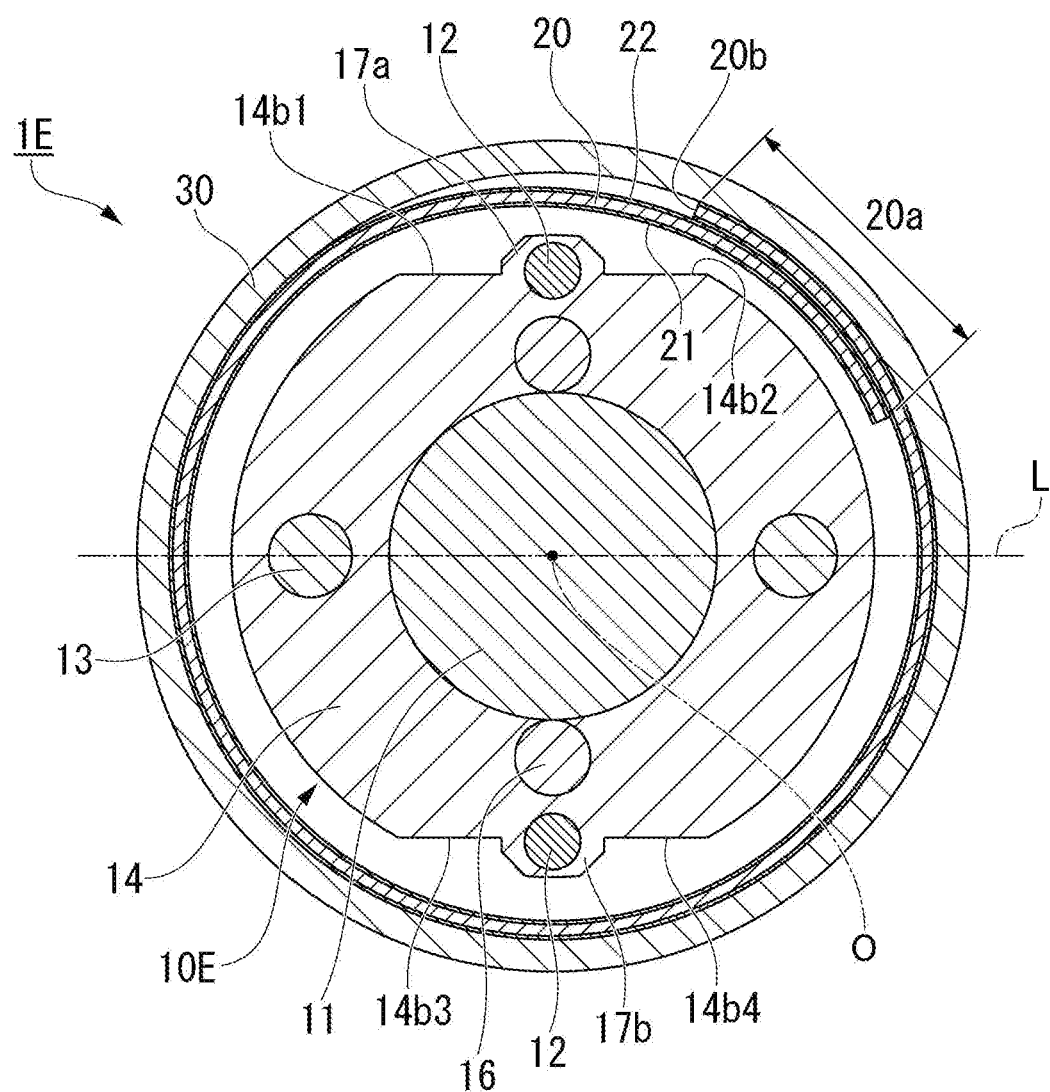
FIG. 8 is a cross-sectional view of an optical fiber cable according to one or more embodiments.

As shown in FIG. 8, in the optical fiber cable 1E (cable body 10E) of one or more embodiments, a plurality of flat surfaces 14b1 to 14b4 are formed on the inner sheath 14. The inner sheath 14 has a shape in which parts of a cylindrical outer peripheral surface are cut out. The first flat surface 14b1 and the second flat surface 14b2 are disposed so as to sandwich the first projection 17a in the circumferential direction. It can also be said that the first projection 17a is formed by a pair of flat surfaces 14b1 and 14b2. Similarly, the third flat surface 14b3 and the fourth flat surface 14b4 are disposed so as to sandwich the second projection 17b in the circumferential direction. It can also be said that the second projection 17b is formed by a pair of flat surfaces 14b3 and 14b4.

The first projection 17a and the second projection 17b extend along the longitudinal direction. In one or more embodiments, at least part of the outer ripcord 12 is located inside the first projection 17a or the second projection 17b. Therefore, the outer ripcord 12 can be pulled out of the outer sheath 30 by holding the first projection 17a or the second projection 17b with the tool K and pulling it up (see FIGS. 3A-3C).

Figure 9:
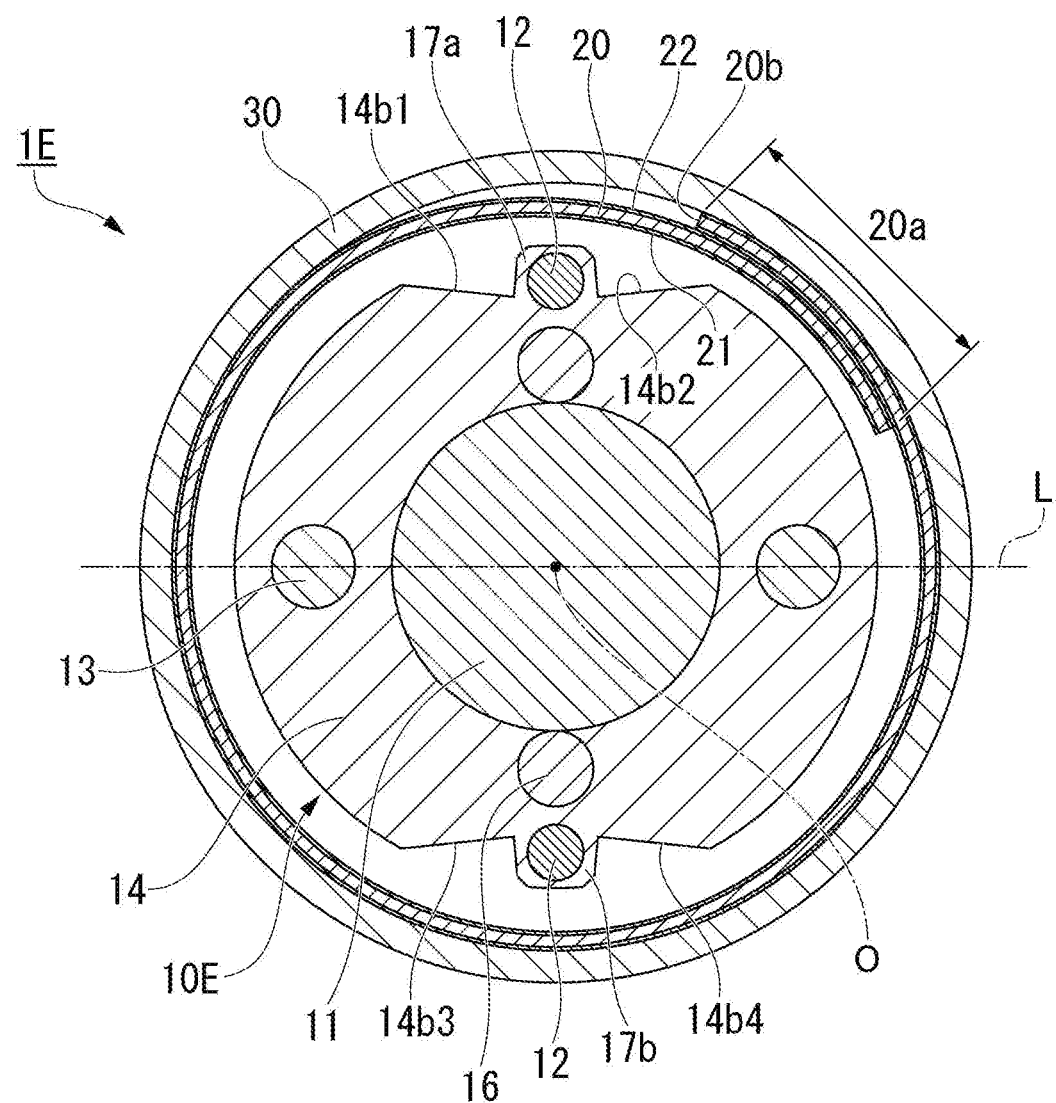
FIG. 9 is a cross-sectional view of an optical fiber cable according to a modification example of one or more embodiments.

The flat surfaces 14b1 to 14b4 extend along the longitudinal direction. Further, the flat surfaces 14b1 to 14b4 extend substantially parallel to the neutral line L in the cross sectional view. However, the shape and arrangement of the flat surfaces 14b1 to 14b4 may be changed as appropriate. For example, as shown in FIG. 9, the flat surfaces 14b1 to 14b4 may be gradually inclined radially inward toward the outer ripcord 12 in the circumferential direction. Further, similarly to FIG. 7 in one or more embodiments, the projections 17a and 17b (outer ripcords 12) may be disposed at positions different from the inner ripcords 16 in the circumferential direction.

It should be noted that the technical scope of the present invention is not limited to the above-described embodiments, and various modifications can be made without departing from the spirit of the present invention. Accordingly, the scope of the invention should be limited only by the attached claims.

For example, in the above-described embodiments, two projections 15, two outer ripcords 12, and two inner ripcords 16 are provided, but the number of these may be changed as appropriate.

In addition, without departing from the spirit of the present invention, it is possible to appropriately replace the constituent elements in the above-described embodiments with well-known constituent elements, and the above-described embodiments and modification examples may be appropriately combined.

For example, the shape of the projection 15 in one or more embodiments may be applied to the optical fiber cable 1A in other embodiments. Even in this case, the same effects as those described in the above-described embodiments can be obtained.

Further, the outer ripcord 12 in the optical fiber cable 1A of one or more embodiments may be covered with a coating 12a.

Figure 10:
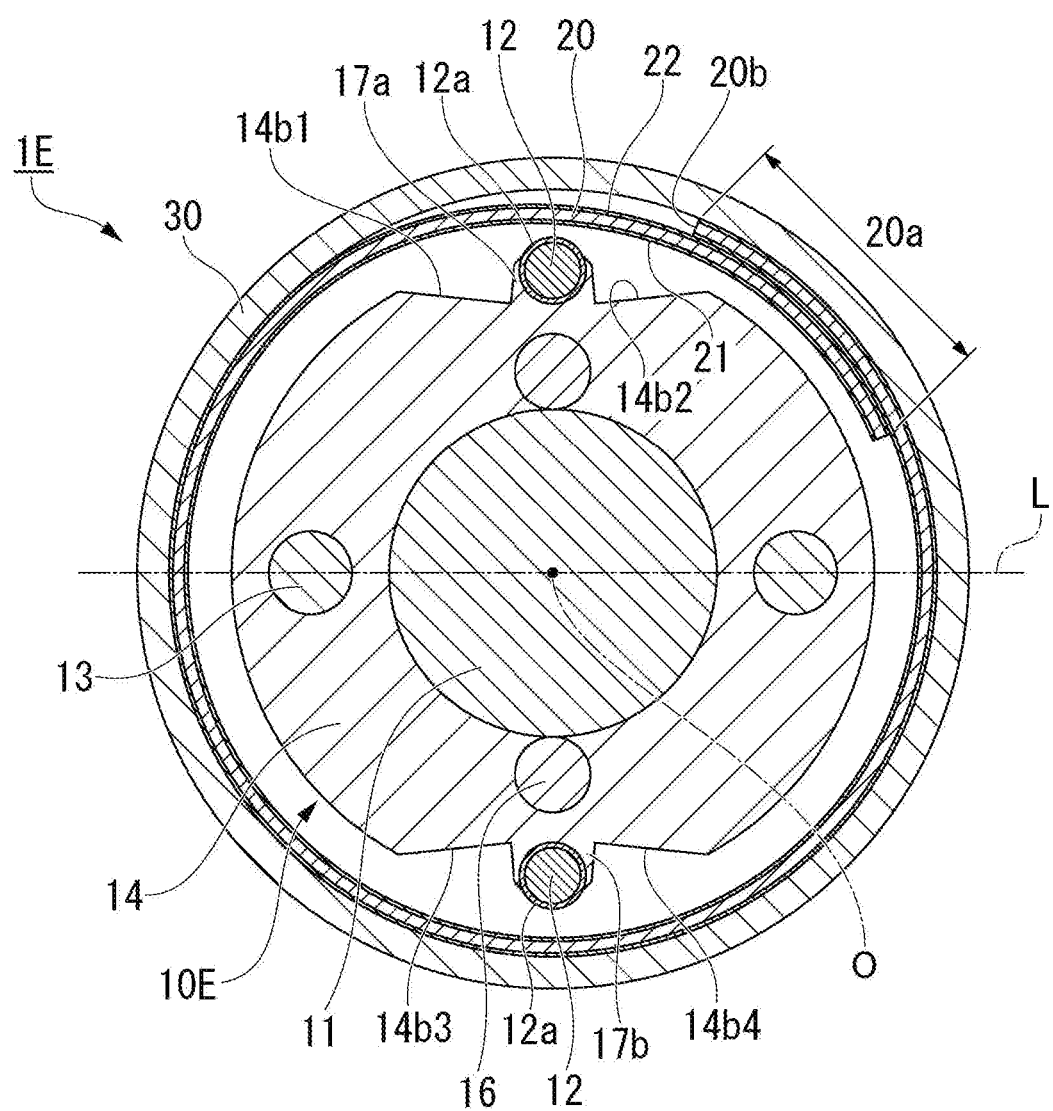
FIG. 10 is a cross-sectional view of an optical fiber cable according to another modification example of one or more embodiments.

Further, by combining one or more of the above-described embodiments, as shown in FIG. 10, the outer ripcords 12 may be exposed from the projections 17a and 17b respectively sandwiched between the flat surfaces 14b1 and 14b2 and the flat surfaces 14b3 and 14b4 that are inclined surfaces. The outer ripcords 12 may be covered with a coating 12a. In this case, the outer ripcord 12 can be easily taken out, and even if the cable body 10E is immersed in cooling water when the cable body 10E is manufactured, water can be prevented from entering the inside of the outer ripcord 12 and the projections 17a and 17b.

REFERENCE SIGNS LIST 1A to 1E Optical fiber cable
10A to 10E Cable body
11 Core
12 Outer ripcord
12a Coating
13 Tension member
14 Inner sheath
14a1 to 14a4 Groove portion
14b1 to 14b4 Flat surface
15 Projection
16 Inner ripcord
17a, 17b Projection
20 Reinforcing sheet
30 Outer sheath

The invention claimed is:

1. An optical fiber cable comprising:
    a cable body comprising a core and an inner sheath that accommodates the core;
    a reinforcing sheet that surrounds the cable body;
    an outer sheath that accommodates the cable body and the reinforcing sheet; and
    an outer ripcord that is embedded in the inner sheath, wherein
    the inner sheath comprises a projection that projects outwardly in a radial direction of the optical fiber cable,
    at least part of the outer ripcord is disposed inside the projection, and
    the projection is integrally formed on the outer surface of the inner sheath.
2. The optical fiber cable according to claim 1, wherein a width of the projection in a circumferential direction of the optical fiber cable increases outwardly in the radial direction.
3. The optical fiber cable according to claim 1, wherein an inner ripcord is embedded in a portion of the inner sheath that is closer to the center of the optical fiber cable than the outer ripcord in the radial direction.
4. The optical fiber cable according to claim 3, wherein d≥t is satisfied,
    where d is an outer diameter of the inner ripcord, and t is a thickness of a portion of the inner sheath where the projection is not formed.
5. The optical fiber cable according to claim 1, wherein a pair of groove portions that are inwardly recessed in the radial direction are formed on an outer peripheral surface of the inner sheath, and
    the projection is formed by the pair of groove portions.
6. The optical fiber cable according to claim 1, wherein a pair of flat surfaces are formed on an outer peripheral surface of the inner sheath and sandwich the projection in a circumferential direction of the optical fiber cable.
7. The optical fiber cable according to claim 1, wherein the outer ripcord is covered with a coating.

* * * * *